A. Taylor,
Reciprocating Steam Engine,
N° 10,647.    Patented Mar. 14, 1854.
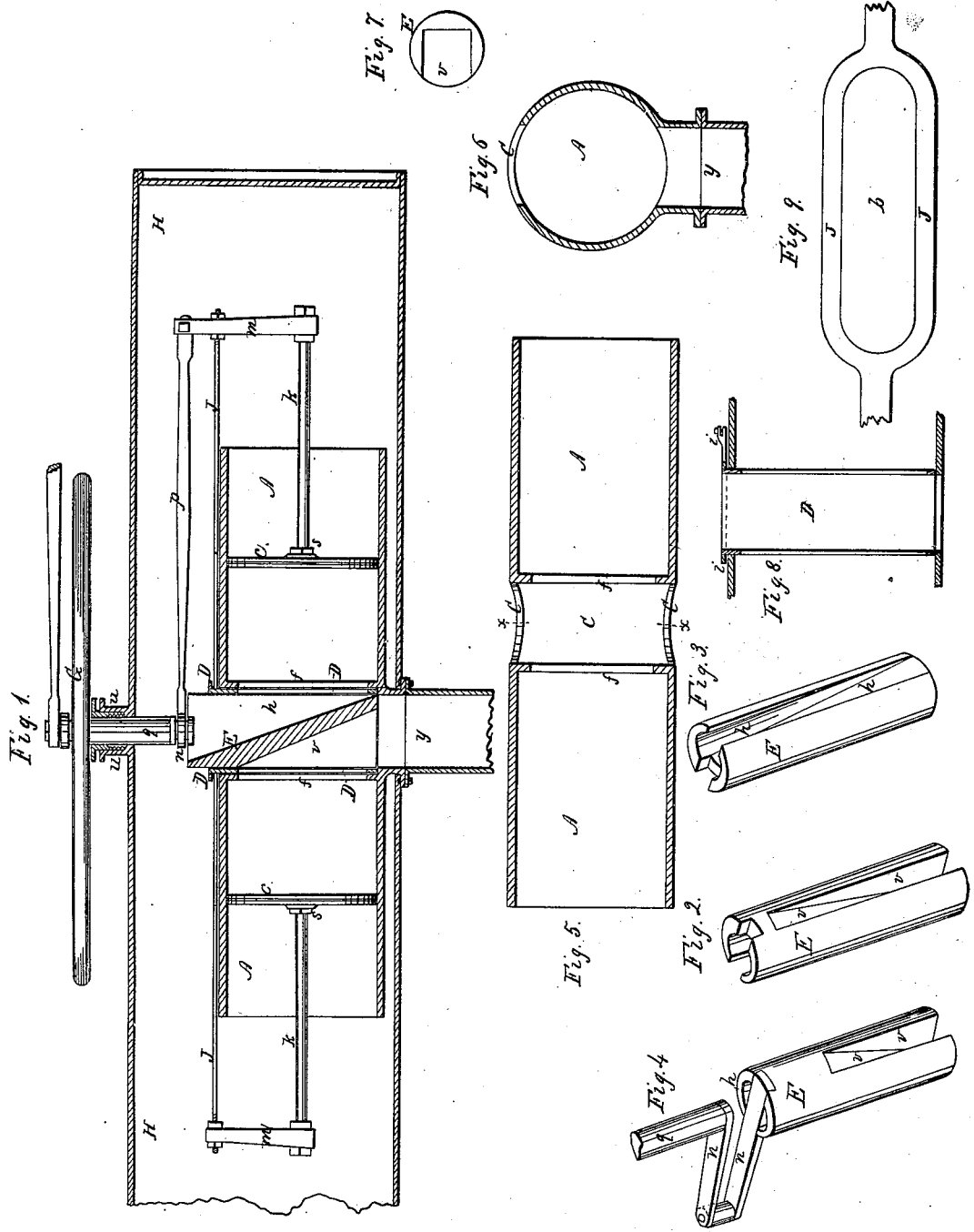

UNITED STATES PATENT OFFICE.

ABIJAH TAYLOR, OF PEKIN, ILLINOIS.

STEAM-ENGINE FAUCET-VALVE.

Specification of Letters Patent No. 10,647, dated March 14, 1854.

*To all whom it may concern:*

Be it known that I, ABIJAH TAYLOR, of Pekin, county of Tazewell, and State of Illinois, have invented certain new and useful Improvements in Steam-Engines; and I do hereby declare that the following is a full, clear, and exact description of my said invention, reference being had to the accompanying drawings, forming part of this specification, in which—

Figure (1) represents a vertical longitudinal section of my improved cylinder, with the various parts completing my engine attached thereto. Figs. (2 and 3) are perspective views of a rotary valve peculiarly constructed and particularly adapted to my engine. Fig. (4) is a perspective view of a valve with the crank and a fragment of the shaft of the balance wheel attached thereto. Fig. (5) is a longitudinal section of the cylinder, with the valve, and cut-off removed, for the purpose of more clearly representing its construction. Fig. (6) is a cross section of the cylinder at the line ($x$ $x$) of Fig. (5). Fig. (7) is an end view of the valve, representing the flat surface hereinafter referred to, also the steam port or passage ($v$). Fig. (8) is a vertical section of the cut-off, showing the steam apertures, and Fig. (9) is a plan of the connecting rod.

To enable others skilled in the art to make and use my improved engine, I will proceed to a description of the same in detail.

Through the center of the steam cylinder (A) is formed a round aperture (C) for the reception of the adjustable cut-off (D) and the rotating valve (E). Within the cylinder (A), and fitting the periphery or outside of the cut-off (D), is placed a partition ($f$). This partition may either form a portion of the cylinder itself, or be firmly attached thereto in any convenient manner.

($i$) represents a lever attached to that portion of the cut-off (D), projecting above the surface of the cylinder, by turning of which, the amount of steam admitted to the cylinder at any given period may be regulated with the greatest precision.

($v$), Figs. (2 and 4), represent inclined or wedge shaped passages which form the ingress port of the valve. This passage extends nearly to the surface of the cylinder, and in diameter may be one-fourth of the circumference of the entire valve.

($h$), Fig. (3), represents the escape passage, and corresponds in form to its opposite or ingress port ($v$), but extends above the surface of the cylinder thus forming the escape. This passage, though of the same form of the ingress port ($v$), is of sufficient depth as shown in Fig. (1), to allow the exhaust free egress into the open air.

To adapt the steam cylinder to my improved rotary valve, and, vice versa, the valve to the cylinder, I construct the latter without heads, which is a great convenience in the manufacture, as well as much saving of labor and expense attending the construction of steam engines of other descriptions.

($c$ $c$) represent the piston heads of any desired construction.

($k$ $k$) are two rods extending from and secured to the piston heads ($c$ $c$) with jam nuts ($s$ $s$) or in any other convenient manner. To the ends of these rods ($k$ $k$) are attached short arms ($m$), which form the connection with the connecting rod (J), above the surface of the cylinder as shown at Fig. (1). The connecting rod (J) in this instance is formed of flat or bar iron, and has a slot ($t$) of sufficient diameter to admit the cut-off (D) to pass through for the purpose of attaching thereto the lever ($i$), and is of sufficient length to correspond with the stroke of the engine. The connecting rod (J) extends the entire length of the cylinder, including the stroke and as near the surface thereof as convenient, thus forming an easy and compact mode of connecting the piston heads ($c$ $c$), as fully represented in Fig. (1); but it may be arranged in the usual manner by ways or guides if deemed expedient. One of the connecting arms ($m$) secured to the rod ($k$), extends somewhat above the connecting rod (J) and is attached to the shaft ($p$), which, connected to the crank ($n$) of the shaft of the balance wheel (G), completes the several parts of my engine.

As a cheap and expeditious mode of constructing my valve it may be formed on the end of the shaft ($q$), in which case the crank would be placed on the upper side of the balance wheel (G), or it may be made separate and secured thereto, as represented in the accompanying drawings. By this mode of constructing my engine it will readily be perceived that by conducting the steam through the pipe ($y$) into the cylinder (A) on its lower surface a sufficient portion of the end of the valve, as shown in the end view, Fig. (7), receiving a portion of the jet of steam, and being formed or attached to shaft of the balance or driving wheel (G), would cause the same under too great a pressure or head of steam to rise from its bed, causing the upper end of the aperture or passage ($v$) to extend above the surface of the cylinder and cut-off, thus permitting the steam to escape direct from the way ($v$) into the air or as the case may be. Should, however, at any time a head of steam be used sufcient to endanger an explosion of the boiler the balance wheel (G) thus arranged with my improved valve attached thereto, in the manner described will rise sufficient to permit the steam to "blow off" above the cylinder through the passage ($v$), thus relieving the boiler instantly without causing a check in the motion of the engine or requiring the least attention of the engineer.

Should it be found desirable in any case, my engine may be constructed with the piston rod connecting the two heads within the cylinder, the same passing through a stuffing box arranged in any suitable manner.

Having thus fully described my improved steam engine, what I claim therein as new and desire to secure by Letters Patent, is:

My peculiar valve constructed, adapted and arranged, in such manner, as to perform the functions of a safety and pressure valve as herein described.

ABIJAH TAYLOR.

Witnesses:
　SAML. GRUBB,
　S. P. RITTLE.